United States Patent
Wang et al.

(10) Patent No.: US 12,470,433 B2
(45) Date of Patent: Nov. 11, 2025

(54) CHANNEL ESTIMATION OPTIMIZATIONS IN WIRELESS COMMUNICATION SYSTEMS

(71) Applicant: GREATER SHINE LIMITED, New Taipei (TW)

(72) Inventors: Yuanye Wang, San Diego, CA (US); Jian Gu, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 404 days.

(21) Appl. No.: 18/146,339

(22) Filed: Dec. 23, 2022

(65) Prior Publication Data
US 2023/0126861 A1   Apr. 27, 2023

Related U.S. Application Data

(63) Continuation of application No. PCT/US2021/016930, filed on Feb. 5, 2021.
(Continued)

(51) Int. Cl.
*H04L 25/02* (2006.01)
*H04L 5/00* (2006.01)

(52) U.S. Cl.
CPC ........ *H04L 25/0224* (2013.01); *H04L 5/0048* (2013.01)

(58) Field of Classification Search
CPC .............. H04L 25/0224; H04L 5/0048; H04L 25/0232; H04L 27/2695; H04L 27/2675; H04L 27/26132; H04L 27/2657; H04L 25/0222; H04L 27/2602; H04W 52/52; H04W 52/54
See application file for complete search history.

(56) References Cited

U.S. PATENT DOCUMENTS 11,901,964 B2 *   2/2024   Cha ................... H04B 17/328
12,095,692 B2 *   9/2024   Xin ................... H04L 27/2607
(Continued)

FOREIGN PATENT DOCUMENTS

| EP | 2975896 A1 | 1/2016 |
|---|---|---|
| WO | 2018128923 A1 | 7/2018 |
| WO | 2020006652 A1 | 1/2020 |

OTHER PUBLICATIONS

Extended European Search Report of the European application No. 21717297.2, issued on Sep. 1, 2023, 9 pages.
(Continued)

*Primary Examiner* — Jung Liu
(74) *Attorney, Agent, or Firm* — PERKINS COIE LLP

(57) ABSTRACT

A method performed by a receiver of a wireless communications system to reduce the latency of channel estimation. The method includes receiving a data signal and a sequence of reference signals communicated over a wireless communication channel. In response to determining that the data signal is time critical or that a threshold reliability of the channel estimation is not required, the receiver estimates a channel condition of the wireless communication channel based on a portion of the sequence of reference signals. The receiver performs demodulation and decoding of the data signal prior to processing the entirety of the sequence of reference signals. The demodulation and decoding are adapted based on the estimated channel condition of the wireless communication channel.

19 Claims, 6 Drawing Sheets

Related U.S. Application Data

(60) Provisional application No. 63/057,732, filed on Jul. 28, 2020.

(56) References Cited

U.S. PATENT DOCUMENTS

| | | | | |
|---|---|---|---|---|
| 12,113,615 B2 * | 10/2024 | Xu | | H04L 1/0057 |
| 12,177,150 B2 * | 12/2024 | Medles | | H04W 72/0446 |
| 12,212,515 B2 * | 1/2025 | Taherzadeh Boroujeni | | |
| | | | | H04L 5/0053 |
| 12,250,036 B2 * | 3/2025 | Papasakellariou | | H04L 5/0092 |
| 2019/0159181 A1 * | 5/2019 | Manolakos | | H04W 72/23 |
| 2020/0059895 A1 | 2/2020 | Asangbeng | | |
| 2021/0014095 A1 * | 1/2021 | Ly | | H04W 72/23 |
| 2022/0116175 A1 * | 4/2022 | Xin | | H04L 5/0048 |
| 2022/0201691 A1 * | 6/2022 | Shi | | H04W 72/53 |
| 2022/0224484 A1 * | 7/2022 | Yi | | H04L 5/0044 |
| 2023/0125714 A1 * | 4/2023 | Lee | | H04W 72/0446 |
| | | | | 370/277 |
| 2024/0072855 A1 * | 2/2024 | Papasakellariou | | H04L 5/0048 |
| 2024/0113829 A1 * | 4/2024 | Medles | | H04L 5/0048 |
| 2024/0179689 A1 * | 5/2024 | Xiong | | H04L 5/0094 |
| 2025/0023760 A1 * | 1/2025 | Fozooni | | H04B 17/373 |

OTHER PUBLICATIONS

Ericsson, "Frame structure and DMRS positions", R1-1612329, 3GPP TSG-RAN WG1 #87 Reno, USA, Nov. 14-18, 2016, 6 pages.
No Author. 3GPP TS 38.214 V16.1.0 Technical Specification Group Radio Access Network; NR; Physical layer procedures for data (Release 16), Mar. 2020, pp. 1-151.
Thomas, Shane. International Application No. PCT/US21/16930, Written Opinion mailed Apr. 16, 2021, pp. 1-4.
Thomas, Shane. International Application No. PCT/US21/16930, International Search Report mailed Apr. 16, 2021, pp. 1-35.

* cited by examiner

CHANNEL ESTIMATION OPTIMIZATIONS IN WIRELESS COMMUNICATION SYSTEMS

CROSS-REFERENCE TO RELATED APPLICATION(S)

This application is a continuation of PCT Application No. PCT/US2021/016930, filed Feb. 5, 2021, which claims priority to U.S. Provisional Application No. 63/057,732, titled "Channel Estimation Optimizations in Wireless Communication Systems," filed on Jul. 28, 2020, the content of which is incorporated herein in its entirety.

TECHNICAL FIELD

The disclosed teachings relate to wireless communications, particularly improvements in channel estimation processes for communications channels.

BACKGROUND

In wireless communications, channel estimation is a process performed at the receiver-side of a communication channel. Channel estimation is performed prior to demodulating and/or decoding a received data signal. The channel estimation is based on channel state information (CSI), which refers to known conditions of channel properties of a communication channel. The CSI describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in communications systems.

The CSI is estimated at the receiver and usually quantized, and feedback is sent to the transmitter. Therefore, the transmitter and receiver can have different CSI. Since channel conditions vary, instantaneous CSI is estimated periodically, on a short-term basis, as a chain of channel estimations. A popular technique includes using the so-called training sequence (or pilot sequence), where a known reference signal is transmitted and a channel matrix is estimated using the combined knowledge of the transmitted and received signal.

A delay anywhere in the channel estimation process causes delay in the demodulation and decoding of the data signal. The resulting latency increases the computation capability requirement for subsequent channel estimations in a sequence of reference signals. Further, the latency increases the burden on subsequent data processing (e.g., demodulating and decoding), limits an achievable data rate, and increases the computation capability requirement and power consumption of the receiver.

BRIEF DESCRIPTION OF THE DRAWINGS

Embodiments of the present technology will be described and explained through the use of the accompanying drawings.

Figure 1:
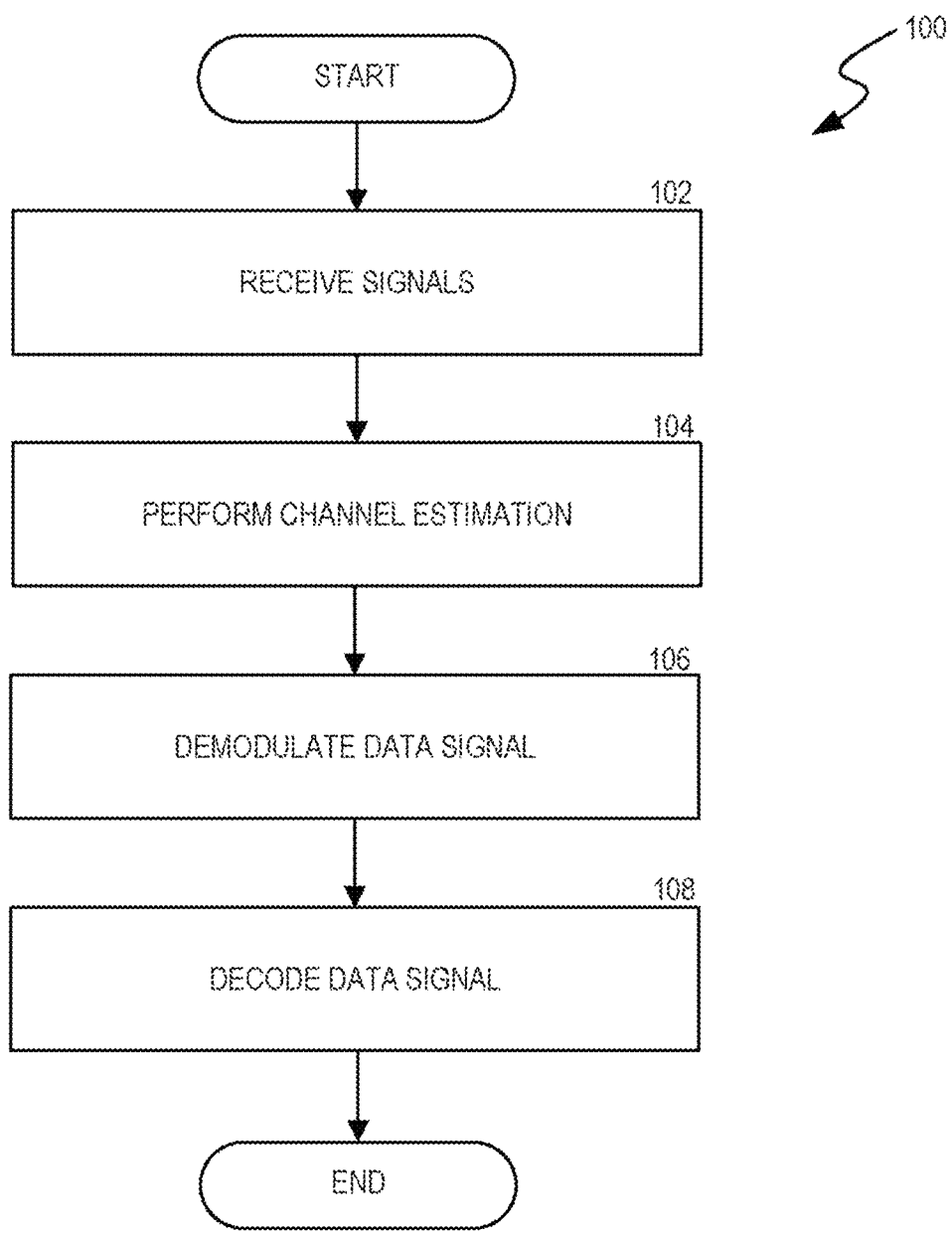
FIG. 1 is a flowchart that illustrates a process performed by a wireless communications system to demodulate and decode data signals.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed solution improves channel estimation processes by, among other things, reducing or minimizing latency in channel estimation. For example, prior techniques process (e.g., demodulate and decode) data signals only after estimating channel conditions based on an entirety of a sequence of reference signals (e.g., until the last reference signal of a transmission unit has been processed). Examples of a transmission unit include a data packet, a slot in 5G New Radio (NR), or a subframe in 4G Long Term Evolution (LTE). A transmission unit typically includes 1, 2, 3, 4, or more reference signals at different points in time. The reference signals of the sequence are interleaved across points in time of the data transmission unit including the data signals.

In prior techniques, demodulating and decoding the data signals of the data transmission unit requires estimating channel conditions for each reference signal and interpolating the resulting channel estimates to adapt for current conditions of the communication channel. Thus, prior channel estimation techniques delay the demodulation and decoding of data signals, which is particularly problematic for time critical data, especially in 5G systems that have ultra-low latency requirements for high performance in speed and processing to manage voluminous network traffic across massively distributed communications devices.

The disclosed solution solves the drawbacks of prior channel estimation techniques by allowing a receiver (e.g., user equipment (UE), base station (BS)) to process a data signal based on a portion of a sequence of reference signals included in a data packet. In other words, under suitable conditions, the receiver can demodulate and decode a data signal based on, for example, a channel estimation based on only one reference signal that arrives at a point in time before or after the data signal. Examples of suitable conditions include a time critical data signal or a determination that a highly reliable channel estimation is not required to process the data signal. The "high" reliability may refer to a maximum reliability from processing an entirety of the sequence of reference signals, which can correspond to an adjustable threshold (e.g., set lower than the maximum). As such, the disclosed solution balances a trade-off between performance and reliability where only a portion of a sequence of reference signals is used for channel estimation when timely processing of data signals is required and/or high reliability of the channel estimate is not required.

The receiver of the wireless communication system can determine when to proceed in a chain of channel estimation calculations (for the sequence of reference signals) based on, for example, a temporal location of a reference signal, a decoding requirement, and/or channel statistics. The solution allows for supporting a high data rate with a given computation capability, reduces a computation capability requirement of the receiver and, as such, reduces the chipset cost. In addition, power consumption is reduced by dynamically relaxing system-wide timing requirements for channel estimation.

In addition to reduced latency, the solution can adjust a quantization bit-width of a data signal or enable reduced memory utilization/size for a modem, which performs the demodulation and decoding. In contrast, prior techniques perform channel estimation by using fixed quantization bit-widths to process received signals. Thus, for example, when reduced or minimized memory utilization is desired, the receiver can reduce a quantization bit-width for a data signal such that the necessary memory space for the modem is reduced. In another example, when improved performance is desired and memory size is not a consideration, the receiver can increase a quantization bit-width to improve the accuracy of demodulation and decoding. The quantization size can adapt to a capability of receiver, a requirement of a receiving chain, fast-fading channel characteristics, etc. Given a fixed memory size, channel estimation latency may require buffering more of a data signal before processing. Thus, each signal is quantized with a lower bit-width to reduce or avoid buffering as a tradeoff for lower demodulation and decoding performance.

FIG. 1 is a flowchart that illustrates a process performed by a wireless communications system to demodulate and decode data signals. The process 100 can be implemented at the physical layer of the receiver of the wireless communication system. The process 100 includes signal reception 102, channel estimation 104, demodulation 106, and decoding 108 of data signals.

At 102, an antenna of the receiver picks-up a signal waveform communicated over a wireless communication channel. The analog signal is quantized digitally and stored in a memory of the receiver. The decoding performance is improved by using a high quantization bit-width for the analog signal. However, the improved decoding performance is achieved at a cost of increasing a memory space requirement to store the quantized data.

At 104, the receiver performs channel estimation based on one or more reference signals sent by a transmitter. An expected reference signal is known to the receiver. As such, the receiver can perform channel estimation by comparing a received reference signal with the expected reference signal. The channel estimation is then used to mitigate the impact of channel conditions on data signals.

At 106, the receiver performs a demodulation operation where each received data signal is represented with one or more bits of information. As used herein, demodulation refers to a process of recovering the transmitted coded bits from the received signal.

At 108, the receiver performs a decoding operation to check for data integrity and correct errors. The reliability of the communication channel is improved by adding redundant bits to the signal at the transmitter side. Doing so aids to detect or correct the errors introduced during transmission.

Figure 2:
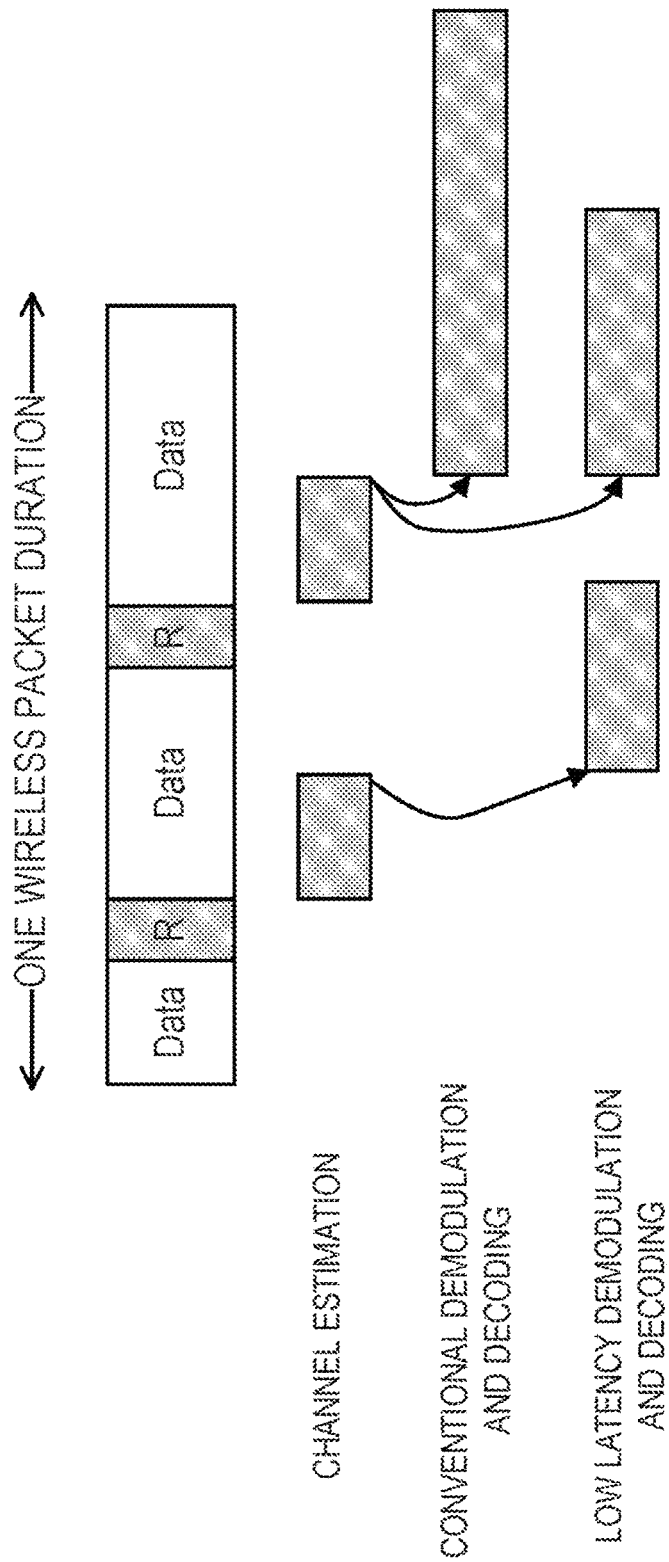
FIG. 2 is a block diagram that illustrates examples of a transmission of data signals interleaved with a sequence of reference signals processed at a receiver.

As described earlier, an entire sequence of reference signals is usually processed by a receiver to perform channel estimation, which is then used to perform demodulation and decoding of data. Specifically, a channel estimate that is used for demodulation and decoding is derived based on an interpolation of the channel estimates calculated for the sequence of reference signals, each received at different points in time. The reference signals themselves are overhead because they do not convey data-related information. As such, it is desirable to reduce the overhead of reference signals. To that end, the transmission of reference signals and data is typically interleaved in time as illustrated in FIG. 2. As shown, a wireless packet includes two reference signals (R) that are interleaved in time between three data signals. Interleaved patterns include different designs for wireless communications systems such as, for example, the common reference signal (CRS) design in 4G LTE and the demodulation reference signal (DMRS) in 5G systems.

As shown in FIG. 2, channel estimation is performed on each received reference signal after being received by the receiver. However, in existing techniques demodulation and decoding typically occurs after performing channel estimation of both reference signals. That is, the channel estimation is more accurate when calculated based on numerous reference signals. However, a tradeoff is that there is a delay in demodulation and decoding of data signals, which is problematic in implementations or applications where the timeliness of data is critical. Further, delaying the demodulation and decoding is unnecessary in environments where the effects of, for example, scattering, fading, and power decay with distance is minimal. In those instances, delaying the demodulation and decoding of the data signals until full channel estimation is performed based on the multiple reference signals creates inefficiencies and delays in processing data.

As shown in FIG. 2, the disclosed "low latency" technique allows for demodulation and decoding prior to receiving the entire sequence of reference signals. Specifically, a data signal is demodulated and decoded immediately after channel estimation is performed based on the first reference signal and continues after channel estimation is performed based on the second reference signal. As such, the example technique provides low latency for demodulation and decoding of data signals.

Figure 3:
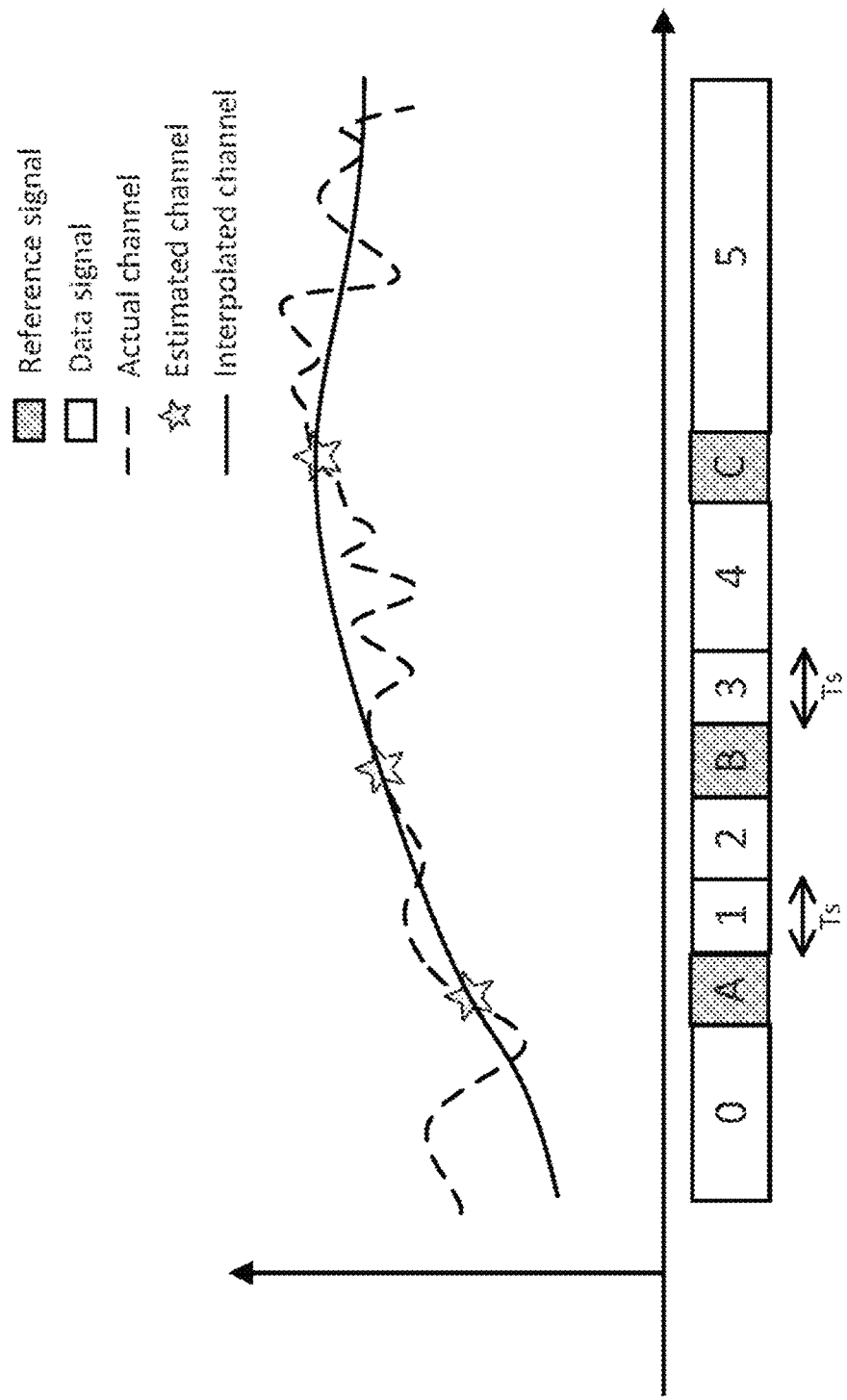
FIG. 3 is a graph that illustrates interpolation of channel estimates for a sequence of reference signals.

FIG. 3 is a graph that illustrates how interpolation of channel estimations for a sequence of reference signals is performed for an entire packet. The horizontal axis of the graph represents time while the vertical axis of the graph represents channel estimate. The packet is shown with data signals 0 through 5 and interleaved reference signals A, B, and C. Each of the data signals have a certain time duration. For example, the data signals 1 and 3 have the same time duration Ts.

The dashed line represents the actual channel over the time duration of the packet. As shown, the actual channel varies over the duration of the packet. The star symbol represents the value of the estimated channel based on the reference signals A, B, or C, respectively. In some instances, the estimated channel for reference signal B is based on the reference signal A and B (e.g., based on a partial interpolation), and the estimated channel for reference signal C is based on the reference signals A, B, and C (e.g., based on a partial or full interpolation). The solid-line represents the interpolated channel based on the reference signals A, B, and C. The interpolated channel is normally used to adjust the demodulation and decoding of the data signals after the entire set of reference signals are processed. The accuracy of the interpolation depends on the interpolation algorithm being used, which has many known variations and, as such, is omitted herein for the sake of brevity.

Figure 4:
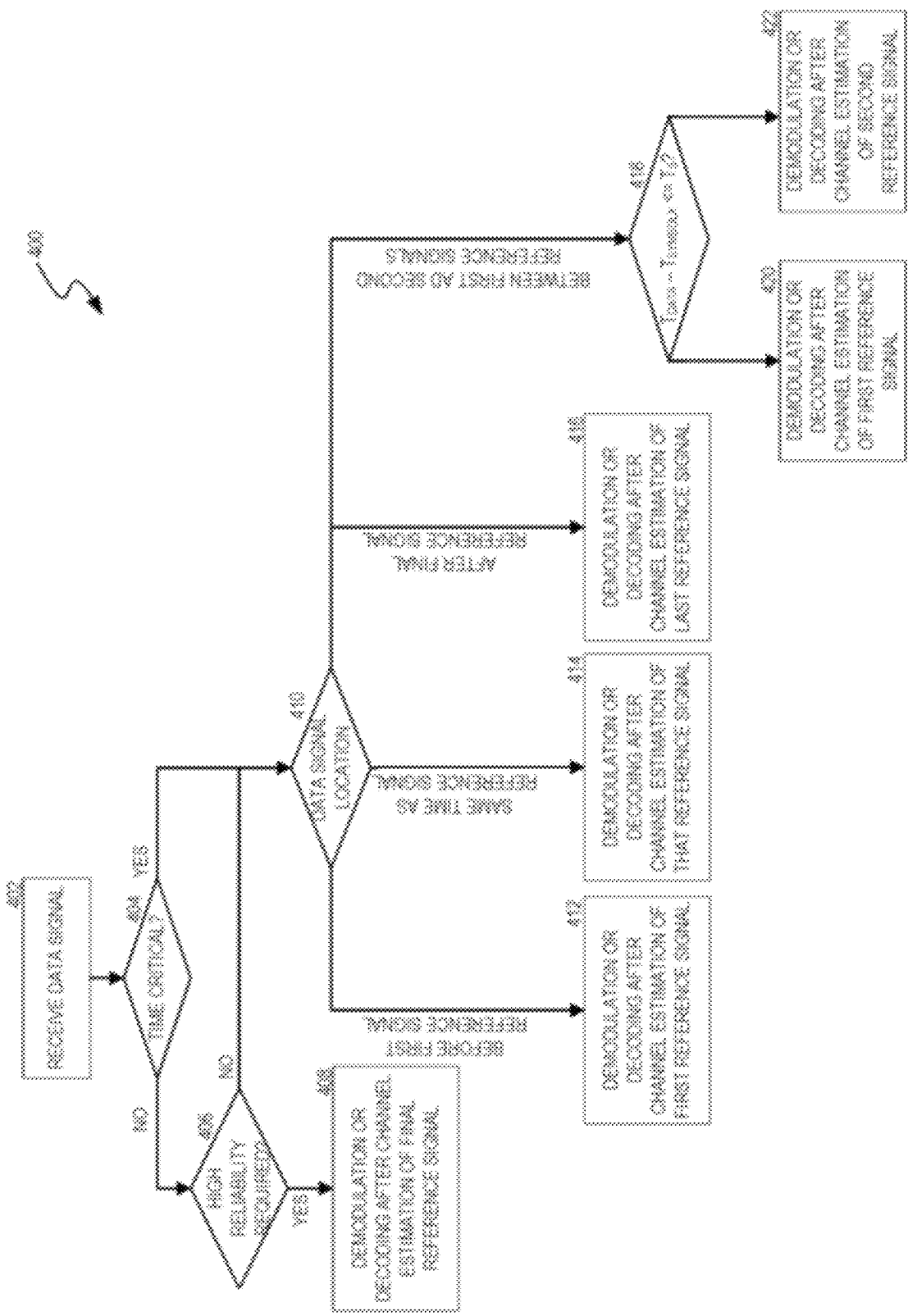
FIG. 4 is a flowchart that illustrates a process for reducing latency in channel estimation.

FIG. 4 is a flowchart that illustrates a process to reduce latency in channel estimation. The process 400 is performed by, for example, a receiver of a wireless communication system. The receiver or related devices can execute one or more algorithms to perform one or more operations of the process 400. The one or more algorithms can include particular implementations understood by persons skilled in the art and, as such, omitted here for the sake of brevity.

At 402, an antenna of the receiver receives one or more data signals and a sequence of reference signals communicated over a wireless communication channel. The data signals and sequence of reference signals are communicated from a transmitter at the other end of the communication channel. In one example, the reference signals of the sequence are interleaved with multiple data signals (see, e.g., FIG. 3).

At 404, the receiver determines whether a data signal is "time critical." A time critical data signal can be determined based on a timing standard implemented by the network, a condition of the communications channel, the type or a capability of the receiver, the nature of the data (e.g., time-sensitive data), etc. Thus, a data signal is time critical when a delay in demodulating or decoding the data signal based on a channel estimation obtained from processing an entirety of the sequence of reference signals is undesirable or unnecessary. In other examples, the receiver can determine whether the data signal is time critical based on a 3GPP timing requirement, a requirement for a processing speed, an amount of data to be processed by the receiver, a location of the receiver, or historical information about the data or receiver. In another example, the receiver determines that the data signal is time critical based on a measure of whether a propagation (e.g., Doppler) of the data signal exceeds a threshold for a best channel estimation. Thus, a relatively small Doppler can trigger implementation of the low latency channel estimation process. In another example, a UE treats every communication as time critical by default and dynamically changes to a more reliably accurate channel estimation process when channel conditions are unfavorable for the low latency channel estimation process.

Consider section 5.3 of 3GPP TS 38.214, which describes a UE Physical Downlink Shared Channel (PDSCH) processing procedure time. A requirement for 30 kHz subcarrier spacing (SC S) includes, from the end of PDSCH reception, that a UE has 13 symbols in time to complete all the necessary processing and to send ACK/NACK feedback to a base station. Assume a DMRS at symbol 2, 5, 8, and 11, and that channel estimation of one DMRS symbol has one symbol duration. For the higher reliability technique, demodulation begins after the last DMRS symbol. Thus, for two consecutive slots of 13 symbols each, this leaves 14 symbols for the UE data chain processing. In contrast, with the disclosed solution, demodulation starts after the first DMRS is processed, which leaves 23 symbols for UE data chain processing. Thus, the low-latency channel estimation process relaxes the timing requirement by 64% thereby allowing for a low-cost low-complexity UE design.

At 406, when the data signal is not time critical, the receiver determines whether a threshold reliability of a channel estimation is not required to process the data signal. A channel estimation that is generated based on an entirety of the sequence of reference signals provides the maximum reliability for the channel estimation. In one example, the threshold reliability has the same degree of reliability of the channel estimation generated based on the entirety of the sequence of reference signals. However, the threshold reliability could be set lower than the maximum but greater than a minimum based on, for example, the channel estimation of a single reference signal. In some examples, the receiver determines that the threshold reliability of the channel estimation is not required based on a signal-to-noise (SNR) level is sufficiently high to indicate that reception quality exceeds a minimum threshold, a modulation and coding scheme (MCS) that is sufficiently low is utilized (e.g., does not require a high SNR), performance loss is above a tolerable level, or a fast fading channel characteristic.

At 408, in response to determining that high reliability is required (e.g., must satisfy the reliability threshold), the receiver employs existing techniques to perform the best channel estimation. For example, the receiver can estimate a channel condition of the communication channel based on the entirety of the sequence of reference signals. The receiver then interpolates a sequence of channel conditions that are temporally distinct based on respective reference signals of the sequence. The receiver then adapts the demodulation and decoding for the data signal based on the interpolated channel conditions. The adapted demodulation and decoding occurs after channel estimation of the final reference signal of the sequence of reference signals.

At 410, in response to determining that the data signal is time critical or that the threshold reliability of the channel estimation is not required, the receiver estimates a channel condition of the wireless communication channel based on a portion of the sequence of reference signals. For example, the receiver can select a reference signal of the sequence of reference signals based on a temporal location of the data signal relative to the reference signal. In one example, the portion of the sequence of reference signals includes only one reference signal corresponding to the selected reference signal. Although many wireless communication systems use front-loaded reference signals when high reliability is needed, the pattern of reference signals in a data packet can vary and, as such, the disclosed technique can handle the different patterns to optimize for low latency.

At 412, in response to determining that the data signal precedes a temporal location of the reference signal, the receiver performs demodulation and decoding of the data signal immediately after performing the channel estimation based on the selected reference signal. The demodulation and decoding for the data signal is adapted to the estimated channel condition generated based on the selected reference signal.

At 414, in response to determining that the data signal and the selected reference signal of the sequence of reference signals have a common temporal location, the receiver performs demodulation and decoding of the data signal after channel estimation based on the selected reference signal. That is, a reference signal arrives at the same time as the data signal. In these instances, the demodulation and decoding of the data signal can occur immediately after the channel estimation is generated based on the selected reference signal.

At 416, in response to determining that a temporal location of a final reference signal of the sequence of reference signals precedes the data signal, the receiver performs demodulation and decoding of the data signal after channel estimation of the last reference signal. In one example, the receiver interpolates estimations of channel conditions based on the respective reference signals of the sequence. The interpolated channel estimation can be used to process the data signal.

At 418, the receiver determines that a temporal location of the data signal is between a first reference signal and a second reference signal of the sequence of reference signals, where the first reference signal precedes the second reference signal. The receiver then determines whether a temporal difference between the data signal and the first reference signal is less than or equal to a time threshold Ts, to determine whether to demodulate and decode the data signal after channel estimation is generated based on the first or second reference signals. The communications channel will remain relatively constant within a short period of time such as, for example, a coherence time. Further, the time threshold Ts is a time window in which a channel estimation for a reference signal can be applied to a later data signal, considering the adverse effects of fast fading channel characteristics. That is, the channel estimation can be considered reliable when within a coherent time of the fast fading channel. In one example, the time threshold Ts is dynamic. For example, when a Doppler frequency is detected to exceed a threshold, the time threshold Ts can narrow. In another example, if high performance (e.g., high throughput) is required, the time threshold Ts is reduced.

At 420, in response to determining that the temporal difference between the data signal and the first reference signal is less than or equal to a time threshold Ts, the receiver can assume that the channel estimation based on the first reference signal is valid for the data signal or extrapolate the current channel condition for processing the data signal based on the first reference signal that precedes the data signal.

At 422, in response to determining that the temporal difference between the data signal and the first reference signal exceeds the time threshold Ts, the receiver waits for the second reference signal and performs interpolation of channel estimations for the sequence of reference signals before proceeding to demodulation and decoding of the data signal. Thus, the current channel condition for processing the data signal is based on the second reference signal. In other words, when the time gap between the location of the data signal and the reference signal exceeds the time threshold Ts, the receiver waits for the next reference signal and performs interpolation of the channel estimation before proceeding to demodulation and decoding.

In one example, the process 400 can be employed to process the data signals shown in FIG. 3. For example, under timing-critical conditions, the following scheduling results. For the data signals located at regions #0 and #1, which are adjacent to the reference signal A, demodulation and decoding of the data signals at #0 and #1 occurs after channel estimation is performed based on the reference signal A. For the data signals located at regions #2 and #3, which are adjacent to reference signal B, demodulation and decoding of the data signals #2 and #3 occurs after channel estimation is performed based on the reference signal B. For the data signals located in regions #4 and #5, which are adjacent to the reference signal C, demodulation and decoding of the data signals #4 and #5 occurs after channel estimation is performed based on the reference signal C. Therefore, for example, for the data signals of regions #0 to #3, latency is reduced because demodulation and decoding occurs before the channel estimation completes on all reference signals.

Figure 5:
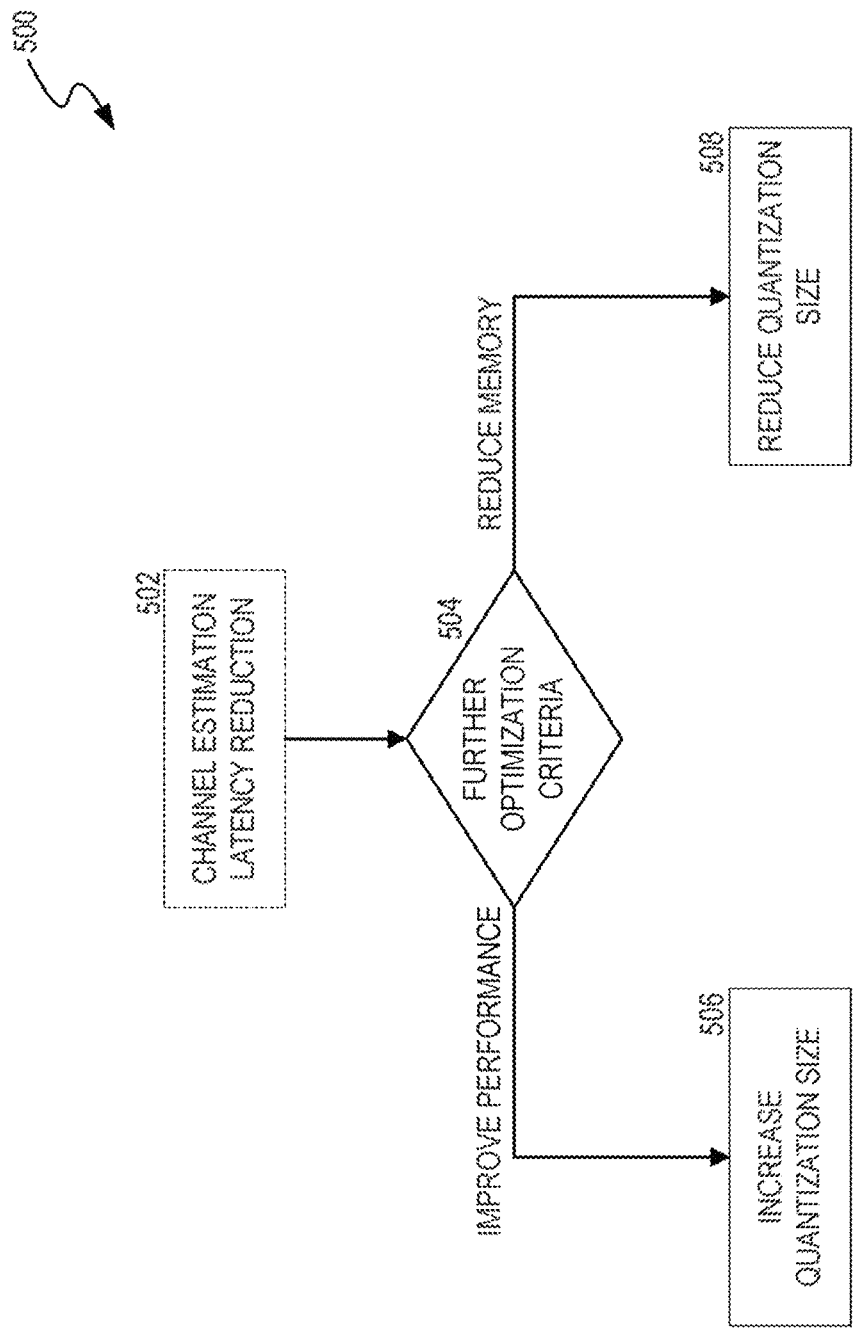
FIG. 5 is a flowchart that illustrates a process for dynamically adjusting quantization size to either improve performance or reduce memory space to further optimize channel estimation

FIG. 5 is a flowchart that illustrates a process 500 for dynamically adjusting quantization size of channel estimation data to either improve performance or reduce memory space to further optimize the low-latency channel estimation. The adjustment can occur after or independent of the process 400 (at 502).

At 504, the receiver determines whether the channel estimation should be further optimized for performance or memory space. In one example, the optimization is based on criteria associated with data or reference signals or technical limitations of the receiver or another device involved in the channel estimation processes.

At 506, the receiver determines that a performance criterion is satisfied to improve performance of the channel estimation process by the receiver. In one example, a performance criterion can include highly secure or private data or a requirement for a highly reliable channel estimation. In response to satisfying the performance criterion, the receiver increases the quantization size of the channel estimation data stored at the receiver (e.g., the channel estimation sample results for respective reference signals or the interpolated channel estimation). Given the greater quantization bit-width, the accuracy of the channel estimation results increases; however, the required memory space increases as well.

At 508, the receiver determines that a memory space criterion is satisfied to reduce utilization of the memory space for storing channel estimation data. In one example, the memory space criterion can include a limited availability of the memory at the receiver. In response to satisfying the memory space criterion, the receiver can maintain or reduce the quantization size for the channel estimation data. Given the reduced quantization bit-width, the required memory space is reduced, along with the accuracy of the results.

Figure 6:
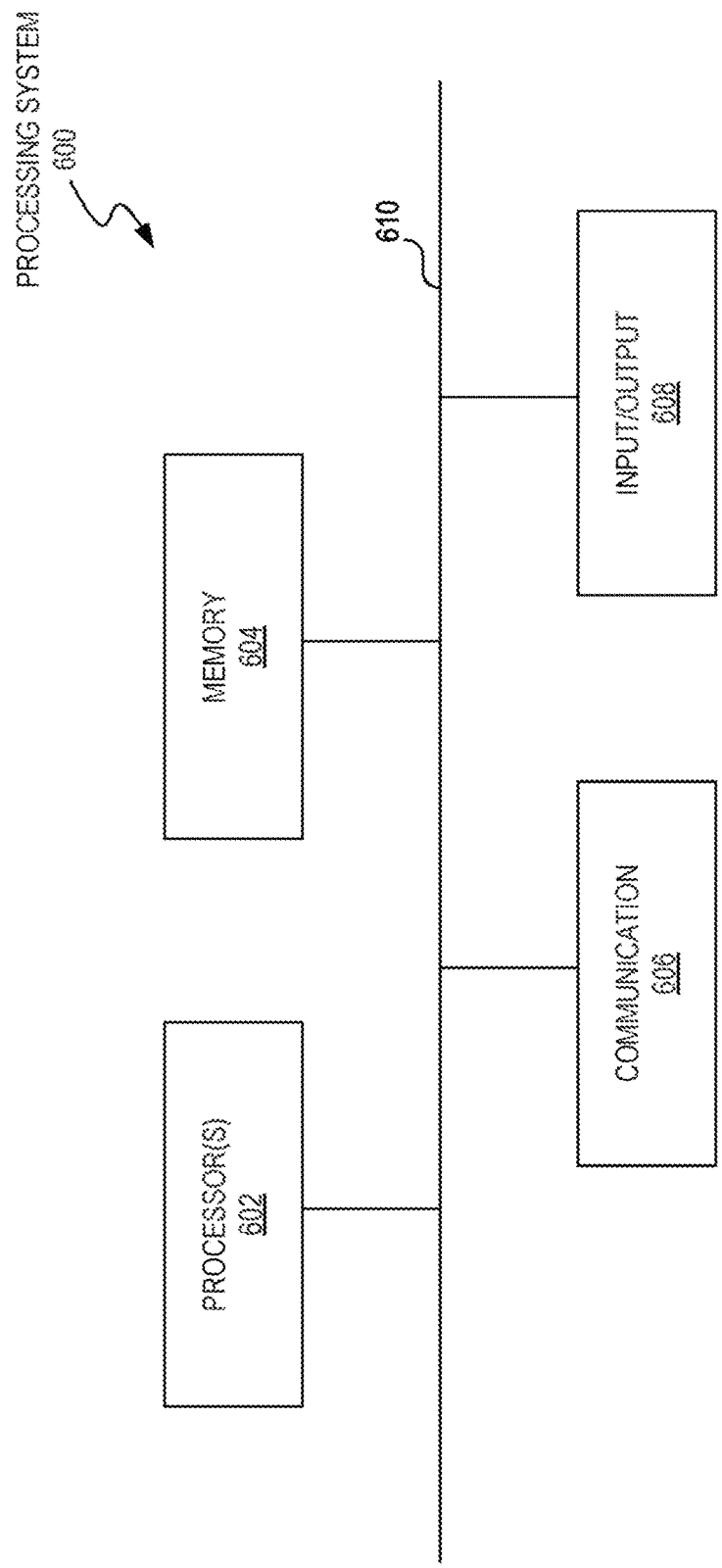
FIG. 6 is a block diagram that illustrates an example of a processing system in which at least some operations described herein can be implemented.

FIG. 6 is a block diagram illustrating an example of a processing system 600 in which at least some operations described herein can be implemented. The processing system 600 represents a system that can run any of the methods/algorithms described herein. For example, any device or component (e.g., module) of the disclosed systems can include or be part of a processing system 600. The processing system 600 can include one or more processing devices, which can be coupled to each other via a network or multiple networks. A network can be referred to as a communication network or telecommunications network.

In the illustrated embodiment, the processing system 600 includes one or more processors 602, memory 604, a communication device 606, and one or more input/output (I/O) devices 608, all coupled to each other through an interconnect 610. The interconnect 610 can be or include one or more conductive traces, buses, point-to-point connections, controllers, adapters and/or other conventional connection devices. Each of the processor(s) 602 can be or include, for example, one or more general-purpose programmable microprocessors or microprocessor cores, microcontrollers, application specific integrated circuits (ASICs), programmable gate arrays, or the like, or a combination of such devices.

The processor(s) 602 control the overall operation of the processing system 600. Memory 604 can be or include one or more physical storage facilities, which can be in the form of random-access memory (RAM), read-only memory (ROM) (which can be erasable and programmable), flash memory, miniature hard disk drive, or other suitable type of storage device, or a combination of such devices. Memory 604 can store data and instructions that configure the processor(s) 602 to execute operations in accordance with the techniques described above. The communication device 606 can be or include, for example, an Ethernet adapter, cable modem, Wi-Fi adapter, cellular transceiver, Bluetooth transceiver, or the like, or a combination thereof. Depending on the specific nature and purpose of the processing system 600, the I/O devices 608 can include devices such as a display (which can be a touch screen display), audio speaker, keyboard, mouse or other pointing device, microphone, camera, etc.

While processes or blocks are presented in a given order, alternative embodiments can perform routines having steps or employ systems having blocks, in a different order, and some processes or blocks can be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks may instead be performed in parallel, or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine can be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 600 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above can include additional, fewer, or different functional components for various applications.

Aspects of the disclosed embodiments can be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

In one embodiment, a method performed by a receiver of a wireless communications system includes: receiving a data signal and a sequence of reference signals communicated over a wireless communication channel, and determining that the data signal is time critical or that a threshold reliability of a channel estimation is not required to process the data signal. The data signal is time critical when a delay in demodulating or decoding the data signal based on a full channel estimation that is generated based on an entirety of the sequence of reference signals is undesirable. The threshold reliability has a degree of reliability of the full channel estimation that is generated based on the entirety of the sequence of reference signals. The method further includes estimating a channel condition of the wireless communication channel based on a portion of the sequence of reference signals in response to determining that the data signal is time critical or that the threshold reliability of the channel estimation is not required, and performing demodulation and decoding of the data signal prior to processing the entirety of the sequence of reference signals. The demodulation and decoding are adapted based on the estimated channel condition of the wireless communication channel.

In another embodiment, a computer-readable storage medium, excluding transitory signals and carrying instructions, when executed by at least one data processor, causes a communications system to: receive multiple data signals interleaved with a sequence of reference signals communicated over a wireless communication channel; estimate a current channel condition for the wireless communications channel based on a portion of the sequence of reference signals; and perform demodulation and decoding of at least one of the multiple data signals based on the estimated current channel condition and prior to processing an entirety of the sequence of reference signals In a further embodiment, a receiver includes: an antenna configured to receive data signals and reference signals communicated over a wireless communication channel; a processor; and a memory including instructions which, when executed by the processor, cause the receiver to: determine that a first data signal is located at a point in time between a first reference signal and a second reference signal of a sequence of reference signals. The first reference signal precedes the second reference signal. The receiver is further caused to determine that a first time difference between the first data signal and the first reference signal is less than a time threshold Ts; and in response to determining that the first time difference is less than the time threshold Ts, estimate a current channel condition for the wireless communications channel based on the first reference signal; and perform demodulation and decoding of the first data signal based on the estimated current channel condition and prior to processing a final reference signal of the sequence of reference signals.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a set of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. One will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments. Aspects of the disclosure can be modified, if necessary, to employ the systems, functions, and concepts of the various references described above to provide yet further embodiments of the disclosure.

These and other changes can be made to the invention in light of the above Detailed Description. While the above description describes certain embodiments of the disclosure, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the disclosed techniques should not be taken to imply that the terminology is being redefined herein to be restricted to any specific characteristics, features, or aspects of the disclosed techniques with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the disclosed techniques are presented below in certain claim forms, the inventors contemplate the various aspects of the techniques in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the disclosed techniques.

What is claimed is:

1. A method performed by a receiver of a wireless communications system, the method comprising:
   receiving a data signal and a sequence of reference signals communicated over a wireless communication channel;
   determining that the data signal is time critical or that a threshold reliability of a channel estimation is not required to process the data signal,
      wherein the data signal is time critical when a delay in demodulating or decoding the data signal based on a full channel estimation that is generated based on an entirety of the sequence of reference signals is undesirable, and
      wherein the threshold reliability has a degree of reliability of the full channel estimation that is generated based on the entirety of the sequence of reference signals;

in response to determining that the data signal is time critical or that the threshold reliability of the channel estimation is not required, estimating a channel condition of the wireless communication channel based on a portion of the sequence of reference signals; and performing demodulation and decoding of the data signal prior to processing the entirety of the sequence of reference signals, wherein the demodulation and decoding are adapted based on the estimated channel condition of the wireless communication channel.

2. The method of claim 1, wherein receiving the data signal and the sequence of reference signals comprises:

receiving the sequence of reference signals interleaved with multiple data signals including the data signal.

3. The method of claim 1, wherein estimating the channel condition of the wireless communication channel comprises:

selecting a reference signal of the sequence of reference signals based on a temporal location of the data signal relative to the reference signal, wherein the portion of the sequence of reference signals includes only one reference signal corresponding to the selected reference signal.

4. The method of claim 1, wherein estimating the channel condition of the wireless communication channel comprises:

determining that a temporal location of the data signal precedes a reference signal of the sequence of reference signals, wherein the portion of the sequence of reference signals includes the reference signal.

5. The method of claim 1, wherein estimating the channel condition of the wireless communication channel comprises:

determining that the data signal and a reference signal of the sequence of reference signals have a common temporal location, wherein the portion of the sequence of reference signals includes the reference signal.

6. The method of claim 1, wherein estimating the channel condition of the wireless communication channel comprises:

determining that a temporal location of a final reference signal of the sequence of reference signals precedes the data signal; and interpolating channel conditions that are temporally distinct based on respective reference signals of the sequence of reference signals, wherein the demodulation and decoding of the data signal is adapted based on the interpolated channel conditions.

7. The method of claim 1, wherein the data signal is a first data signal, the method further comprising:

determining that a second data signal is not time critical or that the threshold reliability is required to process the second data signal;

estimating the channel condition of the wireless communication channel based on the entirety of the sequence of reference signals; and performing demodulation and decoding of the second data signal based on the estimated channel condition.

8. The method of claim 1, wherein determining that the data signal is time critical or that the threshold reliability of the channel estimation is not required is based on a 3GPP timing requirement, a requirement for a processing speed of the receiver, or an amount of data to be processed by the receiver.

9. The method of claim 1, wherein determining that the data signal is time critical is based on a measure of propagation of the data signal being below a threshold for a best channel estimation.

10. The method of claim 1, wherein determining that the threshold reliability of the channel estimation is not required is based on a signal-to-noise (SNR) level, a modulation and coding scheme (MCS), or a fast fading channel characteristic.

11. The method of claim 1, wherein estimating the channel condition of the wireless communication channel comprises:

determining that a temporal location of the data signal occurs between a first reference signal and a second reference signal of the sequence of reference signals, wherein the first reference signal precedes the second reference signal;

determining that a temporal difference between the data signal and the first reference signal is less than or equal to a time threshold Ts; and extrapolating the current channel condition for the data signal based on the first reference signal that precedes the data signal.

12. The method of claim 1, wherein estimating the channel condition of the wireless communication channel comprises:

determining that a temporal location of the data signal occurs between a first reference signal and a second reference signal of the sequence of reference signals, wherein the first reference signal precedes the second reference signal; and determining that a temporal difference between the data signal and the first reference signal exceeds a time threshold Ts, wherein the current channel condition for processing the data signal is based on the second reference signal.

13. The method of claim 1 further comprising:

quantizing data of the estimated channel condition to a reduced bit-width such that memory utilization at the receiver is reduced.

14. The method of claim 1 further comprising:

quantizing data of the estimated channel condition to an increased bit-width such that performance of demodulation and decoding at the receiver is increased.

15. A computer-readable storage medium, excluding transitory signals and carrying instructions, which, when executed by at least one data processor, cause a communications system to:

receive multiple data signals interleaved with a sequence of reference signals communicated over a wireless communication channel;

estimate a current channel condition for the wireless communications channel based on a portion of the sequence of reference signals; and perform demodulation and decoding of at least one of the multiple data signals based on the estimated current channel condition and prior to processing an entirety of the sequence of reference signals, wherein the communications system is caused to:

determine that a temporal location of a data signal occurs between a first reference signal and a second reference signal, wherein the first reference signal precedes the second reference signal;

determine that a temporal difference between the data signal and the first reference signal exceeds a time threshold Ts; and obtaining the estimated current channel based on the second reference before demodulating or decoding the data signal.

16. The computer-readable storage medium of claim 15, wherein the communications system is caused to:

determine that a temporal difference between a data signal and a reference signal is less than or equal to a time threshold Ts, wherein a temporal location of the reference signal precedes the data signal, and wherein the portion of the sequence of reference signals corresponds to the reference signal.

17. The computer-readable storage medium of claim 15, wherein the communications system is caused to:

select a reference signal of the sequence of reference signals based on a temporal location of a data signal, wherein the portion of the sequence of reference signals includes only one reference signal corresponding to the selected reference signal.

18. A receiver comprising:

an antenna configured to receive data signals and reference signals communicated over a wireless communication channel;

a processor; and a memory including instructions which, when executed by the processor, cause the receiver to:

determine that a first data signal is located at a point in time between a first reference signal and a second reference signal of a sequence of reference signals, wherein the first reference signal precedes the second reference signal;

determine that a first time difference between the first data signal and the first reference signal is less than a time threshold Ts; and in response to determining that the first time difference is less than the time threshold Ts, estimate a current channel condition for the wireless communications channel based on the first reference signal; and perform demodulation and decoding of the first data signal based on the estimated current channel condition and prior to processing a final reference signal of the sequence of reference signals.

19. The receiver of claim 18, wherein the receiver is caused to:

determine that a second data signal is located at a point in time between a third reference signal and a fourth reference signal of the sequence of reference signals, wherein the third reference signal precedes the fourth reference signal;

determine that a second time difference between the second data signal and the third reference signal is greater than the time threshold Ts; and in response to determining that the second time difference is greater than the time threshold Ts, estimate an updated channel condition for the wireless communications channel based on the fourth reference signal; and perform demodulation and decoding of the second data signal based on the estimated updated channel condition.

* * * * *